United States Patent [19]

Kiyonaga et al.

[11] Patent Number: 5,515,214
[45] Date of Patent: May 7, 1996

[54] MAGNETIC DISK DRIVE WITH A FILTER ASSEMBLY CAPABLE OF REMOVING DUST AND TOXIC GASES

[75] Inventors: Takeshi Kiyonaga; Katsuhiko Yonemoto, both of Tokyo, Japan

[73] Assignee: NEC Corporation, Tokyo, Japan

[21] Appl. No.: 234,112

[22] Filed: Apr. 28, 1994

[30] Foreign Application Priority Data

Apr. 29, 1993 [JP] Japan .................................. 5-125018
May 14, 1993 [JP] Japan .................................. 5-136722

[51] Int. Cl.$^6$ .................................................. G11B 33/14
[52] U.S. Cl. ............................................................. 360/97.02
[58] Field of Search ............................................ 360/97.02

[56] References Cited

U.S. PATENT DOCUMENTS 5,030,260  7/1991  Beck ..................................... 360/97.02

Primary Examiner—A. J. Heinz
Attorney, Agent, or Firm—Sughrue, Mion, Zinn, Macpeak & Seas

[57] ABSTRACT

In a magnetic disk drive, a filter assembly is provided for adsorbing toxic gases. The filter assembly has filters implemented as films capable of adsorbing gases. The gas adsorptive filters are constituted by silver filters, copper filters and carbon filters or by ion-exchange filters, highly water absorptive filters, and fluoric resin filters.

13 Claims, 3 Drawing Sheets

MAGNETIC DISK DRIVE WITH A FILTER ASSEMBLY CAPABLE OF REMOVING DUST AND TOXIC GASES

BACKGROUND OF THE INVENTION

The present invention relates to a filter assembly capable of selectively removing toxic gases and dust floating in and entering a magnetic disk drive, and a magnetic disk drive having such a filter assembly.

It is a common practice with a personal computer or a word processor to use storage implemented as a magnetic disk drive accommodating magnetic disks therein. To meet the increasing demand for greater storage capacity and higher recording density, the spacing between a head and the associated disk must be reduced. However, a reduced spacing between the head and the disk brings about a problem that when dust and toxic gases, i.e., sulfur oxides, nitrogen oxides and chlorides enter the disk drive and deposit on the disks, they erode the disks and cause head crash to occur. To eliminate this problem, it has been customary to provide the disk drive with a filter device made up of a dust filter and a gas filter. For example, a filter device taught in Japanese Utility Model Publication No. 3-37696 consists of a dust filter in the form of filter paper folded in a corrugated configuration, and a gas filter received in a casing and constituted by activated charcoal.

However, the above-described filter device is not satisfactory since the ability thereof to remove dust and toxic gases is not sufficient in relation to materials constituting the individual filters. Particularly, since the ability of the conventional device to remove erosive gases is insufficient, the disks are locally eroded and suffer from microscopic undulations on the surfaces thereof. This results in head crash and, therefore, prevents recording and reproducing characteristics from being effectively maintained, thereby degrading the reliability of a magnetic disk drive.

SUMMARY OF THE INVENTION

It is, therefore, an object of the present invention to provide a filter assembly capable of selectively and effectively removing dust and toxic gases floating in and entering a magnetic disk drive, and a magnetic disk drive having such a filter assembly.

It is another object of the present invention to provide a reliable magnetic disk drive which prevents magnetic disks from being eroded by toxic gases which enters the disk drive and which would cause head crash and other troubles to occur.

In accordance with the present invention, a filter assembly mounted on a magnetic disk drive for removing dust and toxic gases comprises a first filter for removing dust, and second filters provided on both sides of the first filter for removing toxic gases.

Also, in accordance with the present invention, a magnetic disk drive comprises a plurality of magnetic disks mounted on a spindle at predetermined intervals, magnetic heads each facing one of the magnetic disks, a plurality of arms respectively supporting the magnetic heads, a positioning mechanism for positioning the heads by rotating the arms, a casing accommodating the positioning mechanism as well as the disks, heads, and arms, and a filter assembly located on an air flow path in the casing for removing dust and toxic gases. The filter assembly comprises a fiber filter for removing dust, and at least one of thin films of silver, copper and carbon which are formed on both sides of the fiber filter by plating.

Further, in accordance with the present invention, a filter assembly provided on an air flow path in a magnetic disk drive for removing dust and toxic gases comprises a first filter for removing dust, and second filters located upstream and downstream of the first filter with respect to the air flow path for removing toxic gases.

In addition, in accordance with the present invention, a magnetic disk drive comprises a plurality of magnetic disks mounted on a spindle at predetermined intervals, magnetic heads each facing one of the magnetic disks, a plurality of arms respectively supporting the magnetic heads, a positioning mechanism for positioning the magnetic heads by rotating the arms, a casing accommodating the positioning mechanism as well as the disks, heads, and arms, and a filter assembly located on an air flow path in the casing for removing dust and toxic gases. The filter assembly comprises an activated charcoal filter for removing dust, and at least one of ion-exchange resin filters, highly water absorptive polymer filters and fluoric resin filters which are located upstream and downstream of the activated charcoal filter with respect to the air flow path.

BRIEF DESCRIPTION OF THE DRAWINGS

The above and other objects, features and advantages of the present invention will become more apparent from the following detailed description taken with the accompanying drawings in which.

DESCRIPTION OF THE PREFERRED EMBODIMENTS

Figure 1:
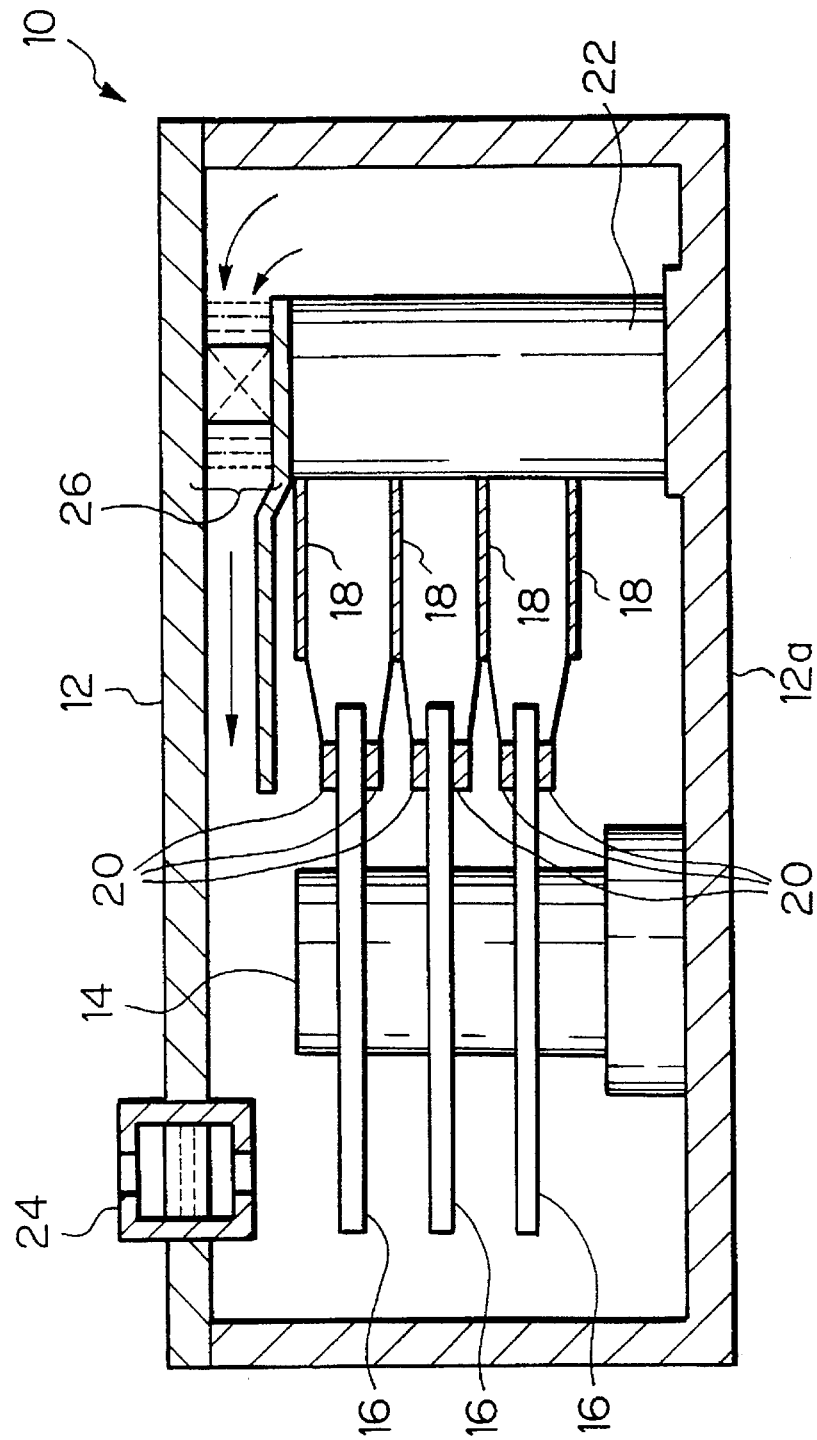
FIG. 1 is a section of a magnetic disk drive incorporating a conventional filter assembly.

To better understand the present invention, a brief reference will be made to a prior art magnetic disk drive capable of removing dust and toxic gases, shown in FIG. 1. As shown, the disk drive 10 has a hermetically sealed casing 12 including a base 12a. A drive mechanism, not shown, for driving magnetic disks 16 is mounted on the base plate 12a. The disks 16 are mounted on a spindle 14 which is directly connected to the drive mechanism. Magnetic heads 20 are respectively fitted on the free ends of arms 18, and each faces the surface of one of the disks 16. The arms 18 are retained by a positioning mechanism 22.

A breathing filter 24 is provided in a part of the casing 12 so as to implement communication of air inside and outside of the disk drive 10. The filter 24, therefore, obviates a pressure difference between the inside and the outside of the apparatus 10 while preventing dust from entering the apparatus 10. A filter assembly 26 is also disposed in the casing 12 and implemented by activated charcoal capable of removing toxic gases and dust. When the disks 16 are rotated, air streams generated on the surfaces of the disks 16 are caused to flow into the filter assembly 26. As a result, dust floating within the apparatus 10 and toxic gases are collected by the filter assembly 26.

However, the conventional filter assembly 26 cannot remove dust and toxic gases satisfactorily, as stated earlier. Therefore, it is likely that erosive gases erode the disks 16 and form microscopic undulations on the surfaces thereof.

Figure 2A:
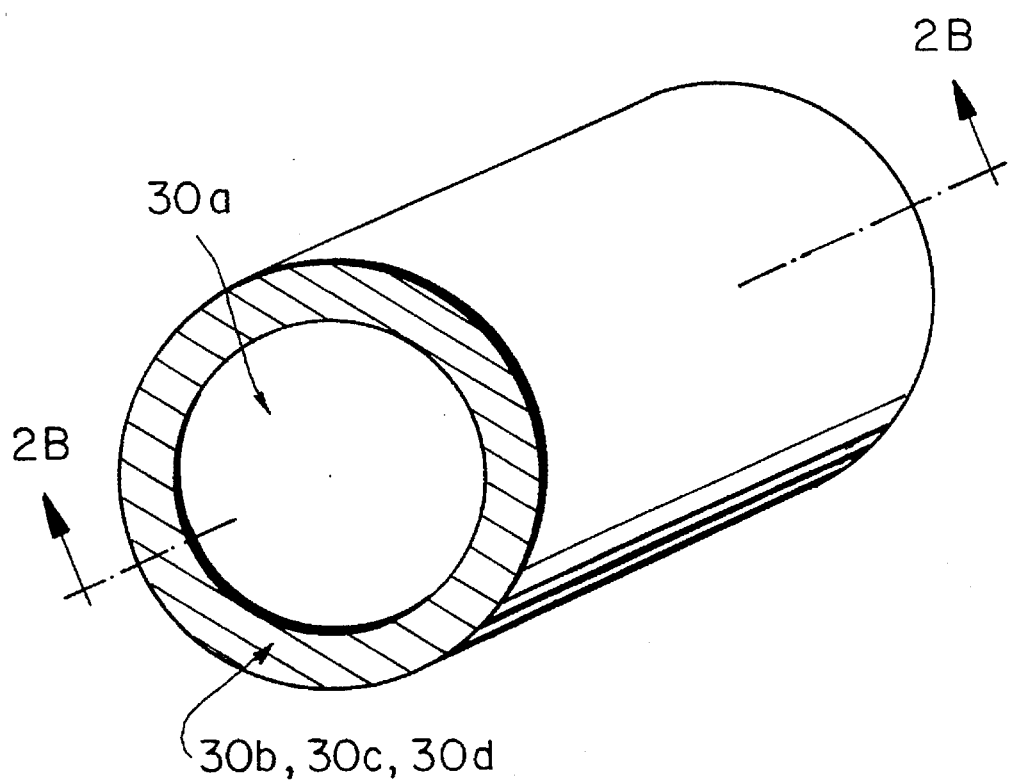
FIG. 2A is a projection view of a filter assembly embodying the present invention.
Figure 2B:
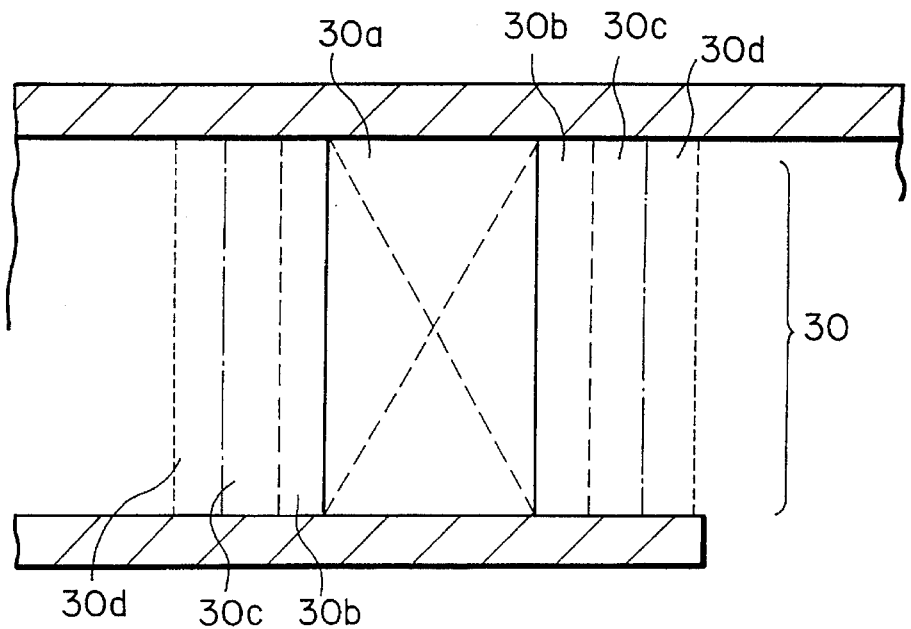
FIG. 2B is a section of a magnetic disk drive implemented with a filter assembly embodying the present invention.

Referring to FIGS. 2A and 2B, a filter assembly embodying present invention is shown and generally designated by the reference numeral 30. As shown, the assembly 30, like the conventional assembly 26 of FIG. 1, is disposed on a path along which air flows within a magnetic disk drive. The assembly 30 has an ordinary filter 30a constituted by fibers, silver filters 30b, copper filters 30c, and carbon filters 30d sequentially formed on both sides of the fiber filter 30a. The filters 30b, 30c and 30d are formed on the fiber filter 30a by evaporation or sputtering of silver, copper, and carbon, respectively.

The silver filters 30b and copper filters 30c cause sulfur oxides SOx and nitrogen oxides NOx to combine with silver and copper to form sulfides and nitrides, respectively. The sulfides and nitrides adhere to the surfaces of such filters. The carbon filters 30d adsorb chlorides contained in air which fills the disk drive. As a result, the silver filters 30b, copper filters 30c and carbon filters 30d each removes a particular gas by changing it to a compound.

The filter assembly 30 is practicable even with one of the three kinds of filters 30b, 30c and 30d or with any desired combination of the filters 30b, 30c and 30d. Further, the assembly 30 may be so configured as to be incorporated in the breathing filter 24, FIG. 1.

A specific procedure for fabricating the filter assembly will be described which forms all the filters 30b, 30c and 30d on the fiber filter 30a by plating. Plating methods are generally classified into two kinds, i.e., dry plating methods and wet plating methods. Typical of dry plating methods are vacuum plating, sputtering, and ion plating. The specific procedure to be described uses sputtering. For sputtering, a vessel having a degree of vacuum of less than 0.01 Torr was filled with algon gas, and cathode power of 0.5 kW was applied. After sputtering was effected for about 2 minutes under such conditions, each filter was measured to be about 200 Å thick. For the silver filters 30b and copper filters 30c, use may be made of a wet plating process, if desired.

More specifically, the fiber filter 30a was constructed of plastic fibers, natural fibers, glass fibers or similar nonconductive fibers. During plating, such fibers were sequentially treated to have hydrophile properties, activated, nonelectolytically plated, and then dried while being rinsed between the consecutive steps. To provide the natural fibers with hydrophile properties, they were subjected to rinsing for degreasing. In the case of plastic fibers, chemical etching was performed by means of acid or alkali, depending on the material. Further, glass fibers were lightly etched by hydrofluoric acid of low density.

For activation, there are available two different methods, i.e., a two-liquid type method which effects sensitization by using tin chloride and activation using palladium chloride, and a one-liquid type method which uses a tin-palladium catalytic liquid. The specific procedure used the one-liquid type method. For nonelectrolytic plating, using the plating liquids shown in Tables 1 and 2 below, thin silver films and thin copper films were formed each having a thickness of 0.3 µm.

TABLE 1

NONELECTROLYTIC SILVER PLATING BATH

| Bath Composition | Density |
| --- | --- |
| silver cyanide | 0.01 mol/l |
| sodium cyanide | 0.03 mol/l |
| sodium hydroxide | 0.019 mol/l |
| dimethylamine borane | 0.034 mol/l |

TABLE 1-continued

NONELECTROLYTIC SILVER PLATING BATH

| Bath Composition | Density |
| --- | --- |
| thiourea | $3.94 \times 10^{-6}$ mol/l |
| Plating temp: 55° C. | |
| Bath pH: 9 | |

TABLE 2

NONELECTROLYTIC COPPER PLATING BATH

| Bath Composition | Density |
| --- | --- |
| copper sulfate | 0.05 mol/l |
| formalin | 0.25 mol/l |
| EDTA | 0.06 mol/l |
| 2,2-dipyridil | 20 mg/l |
| potassium ferrocyanide | 50 mg/l |
| Plating temp: 60° C. | |
| Bath pH: 12.5 (NaOH) | |

It is to be noted that when fibers of conductive metal are used as the material of the fiber filter 30a, the activating process described above is not necessary, and electric plating may be used in place of nonelectrolytic plating.

Figure 3:
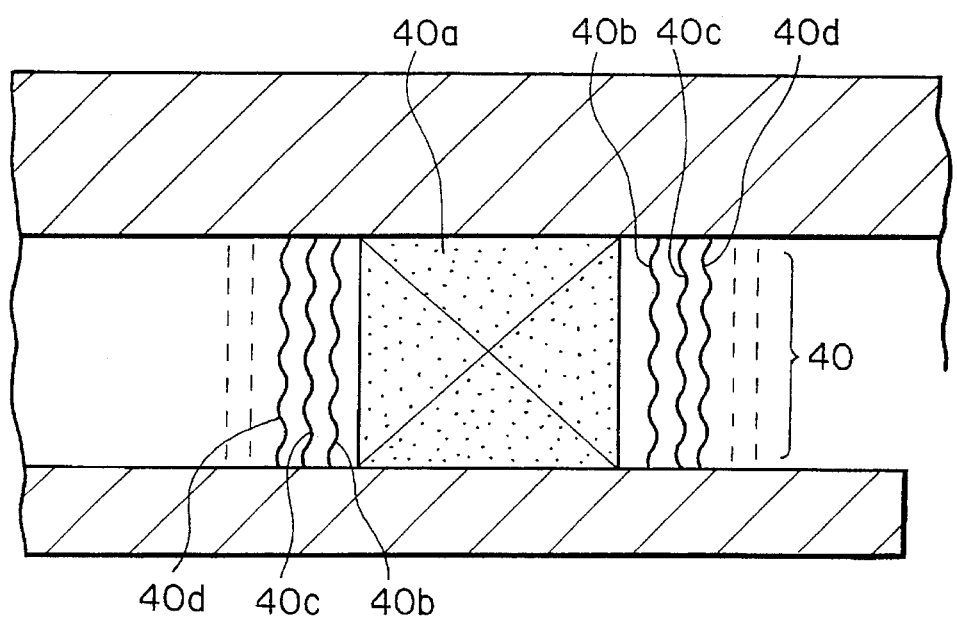
FIG. 3 is a section of a magnetic disk drive to which an alternative embodiment of the present invention is applied.

A reference will be made to FIG. 3 for describing an alternative embodiment of the present invention which is also located on the air flow path in a magnetic disk drive. As shown generally by reference numeral 40, the filter assembly includes an ordinary activated charcoal filter 40a. Ion-exchange resin filters 40b, highly water absorptive polymer filters 40c and fluoric resin filters 40d are provided on the upstream side and downstream side of the activated charcoal filter 40a with respect to the flow of air. In the illustrative embodiment, the ion-exchange resin filters 40b are implemented by an anion-exchange resin (polymer base consisting of polystyrene or similar parent synthetic resin bridged by divinyl benzene, and basic radical coupled to the synthetic resin). The highly water absorptive polymer is constituted by white powder of a vinylalcohol/acrylic acid copolymer (particle size of 180–290µ).

As air inside the disk drive flows, the ion-exchange resin filters 40b effectively absorb sulfur oxides SOx, nitrogen oxides NOx and chlorides being entrained by the stream of air. The fluoric resin filters 40d function in the same manner as the ion-exchange resin filters 40b. The activated charcoal filter 40a effectively absorbs organic gaseous molecules while the highly water absorptive polymer filters 40c serve to enhance the efficiency of the ion-exchange resin.

While the filters 40b, 40c and 40d are each provided in a single layer at either side of the activated charcoal filter, one or more of them may be provided in a plurality of layers, if desired. Again, the filter assembly 40 may be incorporated in the breathing filter 24, FIG. 1.

A series of experiments were conducted with magnetic disk drives respectively accommodating the filter assemblies 30 and 40 and a magnetic disk drive lacking such a filter assembly. A silver sheet and a copper sheet sized about 30×30×2 (mm) each were disposed in each of the disk drives as monitor metal sheets. In this condition, the disk drives were individually continuously operated for thirty days. Thereafter, the thicknesses of the silver sheets and copper sheets were measured by a cathode reduction method. The measured thicknesses are listed in Table 3 below.

TABLE 3

ERODED FILM THICKNESS OF MONITOR SHEET

| | | | |
|---|---|---|---|
| Disk drive with assembly 30 | silver plate | silver chloride | 0 |
| | | silver sulfide | 77 |
| | | unidentified silver compounds | 0 |
| | copper plate | copper sulfide | 0 |
| | | copper oxide | 143 |
| | | unidentified copper compound | 0 |
| Disk drive with assembly 40 | silver plate | silver chloride | 0 |
| | | silver sulfide | 79 |
| | | unidentified silver compounds | 0 |
| | copper plate | copper sulfide | 0 |
| | | copper oxide | 154 |
| | | unidentified copper compound | 0 |
| Disk drive without assembly 30 or 40 | silver plate | silver chloride | 43 |
| | | silver sulfide | 165 |
| | | unidentified silver compounds | 16 |
| | copper Plate | copper sulfide | 89 |
| | | copper oxide | 269 |
| | | unidentified copper compound | 10 |

Table 3 suggests that gases of hydrogen sulfide, sulfurous acid and chloride existed in each disk drive and adsorbed by the silver filters 30b, copper filters 30c and carbon filters 30d or by the ion-exchange resin filters 40b and activated charcoal filter 40a. It was found by experiments that about 3–10 ppb of hydrogen sulfide, about 10–100 ppb of sulfurous acid gas, and several ppb of other gases are present in an ordinary magnetic disk drive lacking the filter assembly. Although such an environment inside ordinary electronic equipment may not be considered critical, the gases affect a magnetic disk drive critically since the disk drive is required to implement a small spacing between a head and a disk, as discussed earlier. In this respect, the filter assembly 30 or 40 of the present invention remarkably enhances the reliability of a magnetic disk drive.

In summary, it will be seen that the present invention provides a filter assembly capable of selectively and effectively removing dust and toxic gases floating in and entering a magnetic disk drive, thereby freeing disks from undulations attributable to erosion. This is successful in minimizing head crash. Further, since the filter assembly is easy to handle, relatively low cost, and durable, it enhances the durability and reliability of a magnetic disk drive.

Various modifications will become possible for those skilled in the art after receiving the teachings of the present disclosure without departing from the scope thereof.

What is claimed is:

1. A filter assembly mounted on a magnetic disk drive for removing dust and toxic gases, comprising:

a fiber filter for removing dust; and at least one thin film of one of silver copper and carbon provided on a surface of said fiber filter by plating for removing toxic gases.

2. A filter assembly as claimed in claim 1, wherein said fiber filter comprises nonconductive fibers.

3. A filter assembly as claimed in claim 1, wherein said fiber filter comprises conductive metal.

4. A filter assembly as claimed in claim 1, wherein said at least one thin film is formed by one of wet plating and dry plating.

5. A filter assembly as claimed in claim 4, wherein said at least one thin film comprises at least one thin film of silver, copper and carbon.

6. A magnetic disk drive comprising:

a plurality of magnetic disks mounted on a spindle at predetermined intervals;

magnetic heads each facing one of said plurality of magnetic disks;

a plurality of arms respectively supporting said magnetic heads;

a positioning mechanism for positioning said magnetic heads by rotating said plurality of arms;

a casing accommodating said positioning mechanism as well as said magnetic disks, said magnetic heads, and said arms; and a filter assembly located in an air flow path in said casing for removing dust and toxic gases;

said filter assembly comprising a fiber filter for removing dust, and at least one thin film of one of silver, copper and carbon formed on a surface of said fiber filter, wherein said thin film is formed by one of vacuum deposition, sputtering, ion plating, and plating.

7. A filter assembly provided in an air flow path in a magnetic disk drive for removing organic gaseous molecules and toxic gases, comprising:

first filter means for removing organic gaseous molecules; and second filter means for removing toxic gases, wherein said second filter means is formed on said first filter means by one of vacuum deposition, sputtering, ion plating, and plating and located upstream and downstream of said first filter means with respect to the air flow path.

8. A filter assembly as claimed in claim 7, wherein said first filter means comprises activated charcoal.

9. A filter assembly as claimed in claim 7, wherein said second filter means comprises at least one of a combination of ion-exchange resin filters and highly water absorptive polymer filters and a combination of fluoric resin filters and highly water absorptive polymer filters.

10. A magnetic disk drive comprising:

a plurality of magnetic disks mounted on a spindle at predetermined intervals;

magnetic heads each facing one of said plurality of magnetic disks;

a plurality of arms respectively supporting said magnetic heads;

a positioning mechanism for positioning said magnetic heads by rotating said plurality of arms;

a casing accommodating said positioning mechanism as well as said magnetic disks, said magnetic heads, and said arms; and a filter assembly located in an air flow path in said casing for removing dust and toxic gases;

said filter assembly comprising an activated charcoal filter for removing dust, and at least one of a combination of ion-exchange resin filters and highly water absorptive polymer filters and a combination of fluoric resin filters and highly water absorptive polymer filters which are located upstream and downstream of said activated charcoal filter with respect to the air flow path.

11. A filter assembly provided in a magnetic disk drive for removing dust and toxic gases, comprising:

first filter means for removing dust; and second filter means for removing toxic gases, wherein said second filter means is formed on said first filter means by one of vacuum deposition, sputtering, ion plating, and plating.

12. A filter assembly as claimed in claim 11, wherein said second filter means comprises at least one thin film of one of silver, copper, and carbon.

13. A filter assembly provided in an air flow path in a magnetic disk drive for removing organic gaseous molecules and toxic gases, comprising:

first filter means for removing organic gaseous molecules; and second filter means for removing toxic gases, wherein said second filter means is located upstream and downstream of said first filter means with respect to the air flow path and comprises at least one of a combination of ion-exchange resin filters and highly water absorptive polymer filters and a combination of fluoric resin filters and highly water absorptive polymer filters.

* * * * *

UNITED STATES PATENT AND TRADEMARK OFFICE
CERTIFICATE OF CORRECTION

PATENT NO. : 5,515,214
DATED : May 7, 1996
INVENTOR(S) : Takeshi Kiyonaga, et al.

It is certified that error appears in the above-indentified patent and that said Letters Patent is hereby corrected as shown below:

Column 2, line 34, delete "a filter assembly" and insert --the filter assembly of FIG. 2A--.

Column 3, line 25, after "assembly" insert --30--.

Signed and Sealed this

Sixth Day of August, 1996

Attest:

BRUCE LEHMAN

Attesting Officer

Commissioner of Patents and Trademarks